United States Patent
Maw et al.

(10) Patent No.: US 7,509,646 B1
(45) Date of Patent: Mar. 24, 2009

(54) METHOD OF MANAGING WORKLOADS IN A DISTRIBUTED PROCESSING SYSTEM

(75) Inventors: Patricia Lynn Maw, Rancho Santa Margarita, CA (US); David George Maw, Lake Elsinore, CA (US)

(73) Assignee: Unisys Corporation, Blue Bell, PA (US)

(*) Notice: Subject to any disclaimer, the term of this patent is extended or adjusted under 35 U.S.C. 154(b) by 1187 days.

(21) Appl. No.: 10/669,041

(22) Filed: Sep. 23, 2003

(51) Int. Cl.
*G06F 9/46* (2006.01)
*G06F 15/16* (2006.01)
*G06F 15/173* (2006.01)
*G06F 9/45* (2006.01)

(52) U.S. Cl. .................... 718/105; 718/104; 709/201; 709/203; 709/223; 709/226; 703/22

(58) Field of Classification Search ......... 718/100–105; 709/201–227; 703/22
See application file for complete search history.

(56) References Cited

U.S. PATENT DOCUMENTS

| | | | |
|---|---|---|---|
| 5,058,583 A | 10/1991 | Geddes et al. | |
| 5,551,013 A | 8/1996 | Beausoleil et al. | |
| 6,079,013 A | 6/2000 | Webb et al. | |
| 6,119,219 A | 9/2000 | Webb et al. | |
| 6,173,306 B1 | 1/2001 | Raz et al. | |
| 6,442,583 B1* | 8/2002 | Eilert et al. | 718/104 |
| 6,496,823 B2* | 12/2002 | Blank et al. | 707/10 |
| 6,654,783 B1* | 11/2003 | Hubbard | 709/202 |
| 6,862,623 B1* | 3/2005 | Odhner et al. | 709/226 |
| 6,963,897 B1* | 11/2005 | Hubbard | 709/201 |
| 6,963,917 B1* | 11/2005 | Callis et al. | 709/227 |
| 6,996,517 B1* | 2/2006 | Papaefstathiou | 703/22 |
| 7,003,547 B1* | 2/2006 | Hubbard | 709/201 |
| 7,020,678 B1* | 3/2006 | Hubbard | 709/201 |
| 7,039,670 B2* | 5/2006 | Hubbard et al. | 709/201 |
| 7,082,474 B1* | 7/2006 | Hubbard | 709/245 |
| 7,092,985 B2* | 8/2006 | Hubbard | 709/201 |
| 2002/0152307 A1* | 10/2002 | Doyle et al. | 709/225 |
| 2003/0177160 A1* | 9/2003 | Chiu et al. | 709/100 |
| 2004/0187131 A1* | 9/2004 | Dageville et al. | 718/100 |
| 2004/0230974 A1* | 11/2004 | Hamilton et al. | 718/100 |
| 2004/0230981 A1* | 11/2004 | Hamilton et al. | 718/104 |
| 2004/0250250 A1* | 12/2004 | Hamilton et al. | 718/102 |
| 2005/0010664 A1* | 1/2005 | Hubbard | 709/224 |

OTHER PUBLICATIONS

Downey, "A Parallel Workload Model and Its Implications for Processor Allocation", Cluster Computing 1998, pp. 133-145.*
Zhang et al., "Improving Distributed Workload Performnace by Sharing Both CPU and Memory Resources", IEEE, 2000, pp. 233-244.*

* cited by examiner

*Primary Examiner*—Meng-Ai An
*Assistant Examiner*—Jennifer N To
(74) *Attorney, Agent, or Firm*—James E. Goepel; Alfred W. Kozak

(57) ABSTRACT

An embodiment of the present invention is a method for generating a simulated processor load on a system of CPU's, and introducing a controlled workload into the system that is spread evenly across the available CPU resources and may be arranged to consume a precise, controllable portion of the resources.

2 Claims, 4 Drawing Sheets

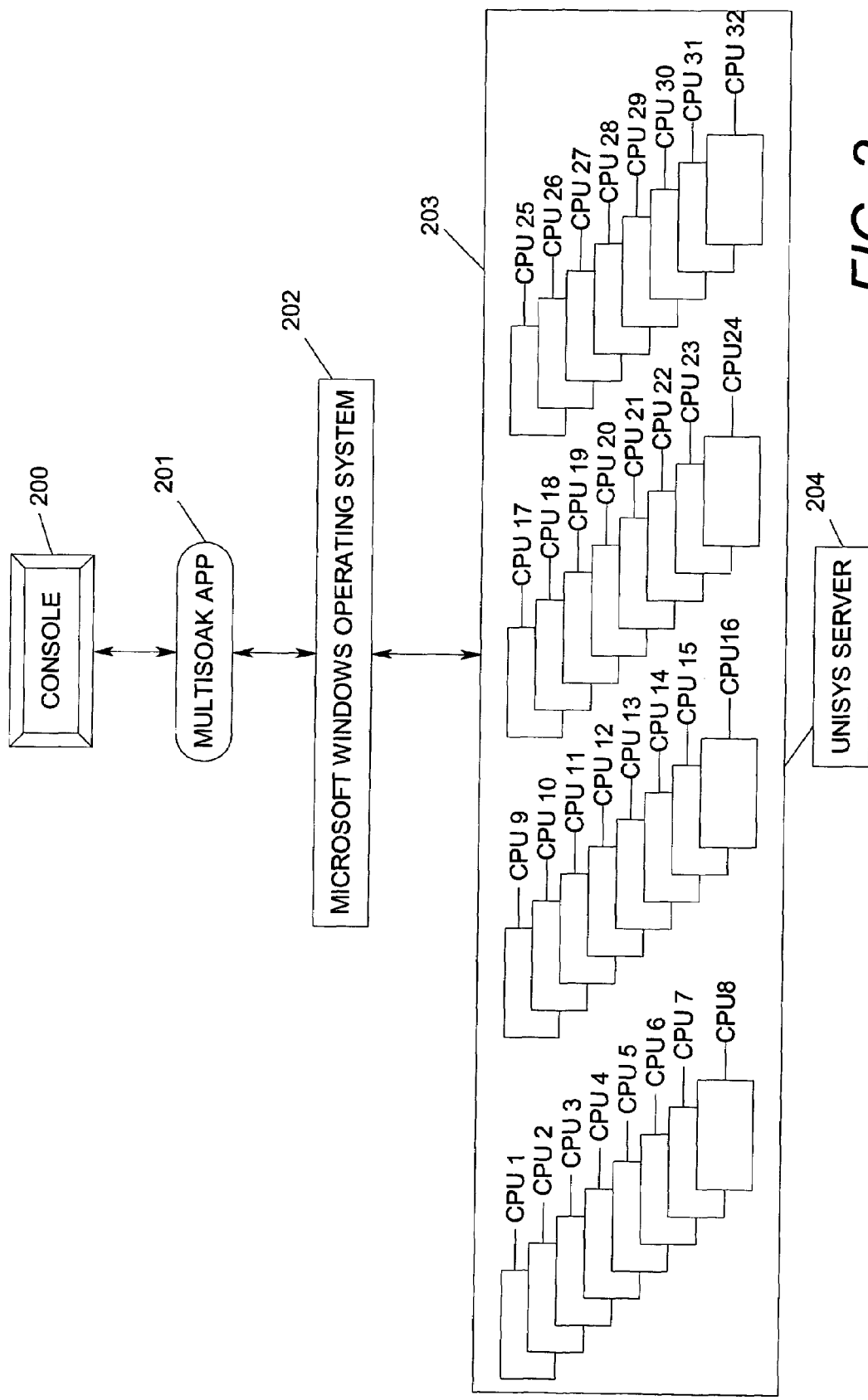

METHOD OF MANAGING WORKLOADS IN A DISTRIBUTED PROCESSING SYSTEM

CROSS-REFERENCES TO RELATED CASES

This application is related to a co-pending application U.S. Ser. No. 09/638,073 entitled "AFFINITY CHECKING PROCESS FOR MULTIPLE PROCESSOR, MULTIPLE BUS OPTIMIZATION OF THROUGHPUT", now U.S. Pat. No. 6,742,086, which is incorporated herein by reference.

This application is related to a co-pending application U.S. Ser. No. 10/334,341 entitled "DYNAMICALLY GENERATING MASKS FOR THREAD SCHEDULING IN A MULTIPROCESSOR SYSTEM", now U.S. Pat. No. 7,275,249, which is incorporated herein by reference.

BACKGROUND OF THE INVENTION

1. Field of the Invention

The present invention generally relates to an application that generates a simulated processor load on a system. The load is specified as the percentage to consume of some or all of the processor resources available on the system, and can also be specified by a parameter; or by default, in which the load is spread across all processors on the system.

2. Description of Related Art

In order to demonstrate the process and processor affinity features of large multi-processor systems such as the Unisys ES7000 Cellular Multiprocessor Platform (CMP), it is necessary to introduce a controlled workload onto the system. For efficiency purposes, the workload must be evenly spread across the available CPU resources and must consume a precisely (within 1% or so) controllable portion of those resources. Applications that consume processor resources are called "soaker" applications because they "soak" a processor with repetitive operations to keep it busy. Various existing soaker applications, such as Microsoft's CPU Stress tool (cpustrss.exe from the Windows Platform SDK) are available to simulate workloads that consume all of one or more processor's time, but no tools are available that could:

(a) distribute a controlled load evenly across a large number of processors;
(b) specify an arbitrary subset of the processors (which ones should be made busy and which should be left idle).

This situation made it difficult to demonstrate the advantages of the presently indicated process affinity management offerings, which monitor the performance of process groups (defined by the user) and automatically add more processors to a group when the group is not getting sufficient processor resources.

One related art method to which the method of the present invention generally relates is described in U.S. Pat. No. 6,079,013 entitled "Multiprocessor Serialization With Early Release Of Processors". This prior art method is a pipelined multiprocessor system for ESA/390 operations which executes a simple instruction set in a hardware controlled execution unit and executes a complex instruction set in a milli-mode architected state with a millicode sequence of simple instructions in the hardware controlled execution unit, comprising a plurality of CPU processors each of which is part of said multiprocessing system and capable of generating and responding to a quiesce request, and controls for system operations which allow the CPUs in the ESA/390 system to process the local buffer update portion of IPTE and SSKE operations without waiting for all other processors to reach an interruptible point, and then to continue program execution with minor temporary restrictions on operations until the IPTE or SSKE operation is globally completed. In addition, Licensed Internal Code (LIC) sequences are defined which allow these IPTE and SSKE operations to co-exist with other operations which require conventional system quiescing (i.e. all processors must pause together), and to allow for CPU retry actions on any of the CPUs in the system at any point in the operation.

The present invention differs from the above related cited art in that the prior invention focuses on a method for sharing and synchronizing operations between CPUs. This related art method does not involve deliberately making a particular CPU reach and maintain a specified degree of busy-ness, as does the method of the present invention. In fact, the related art method seems to be more focused on keeping the CPU as un-busy as possible.

Yet another related art method to which the method of the present invention generally relates is described in U.S. Pat. No. 6,119,219 entitled "System Serialization With Early Release Of Individual Processor". This prior art method is a pipelined multiprocessor system for ESA/390 operations which executes a simple instruction set in a hardware controlled execution unit and executes a complex instruction set in a milli-mode architected state with a millicode sequence of simple instructions in the hardware controlled execution unit, comprising a plurality of CPU processors each of which is part of said multiprocessing system and capable of generating and responding to a quiesce request, and controls for system operations which allow the CPUs in the ESA/390 system to process the local buffer update portion of IPTE and SSKE op rations without waiting for all other processors to reach an interruptible point, and then to continue program execution with minor temporary restrictions on operations until the IPTE or SSKE operation is globally completed. In addition, Licensed Internal Code (LIC) sequences are defined which allow these IPTE and SSKE operations to co-exist with other operations which require conventional system quiescing (i.e. all processors must pause together), and to allow for CPU retry actions on any of the CPUs in the system at any point in the operation.

The present invention differs from this related art in that the cited prior art focuses on a method for sharing and synchronizing operations between CPUs. This prior art method does not involve deliberately making a particular CPU reach and maintain a specified degree of busyness, as does the method of the present invention. In fact, the prior related art method seems to be more focused on keeping the CPU as un-busy as possible.

Yet another related art method to which the method of the present invention generally relates is described in U.S. Pat. No. 5,551,013 entitled "Multiprocessor For Hardware Emulation". The prior art method is a software-driven multiprocessor emulation system comprising a plurality of emulation processors connected in parallel in a module. One or more modules of processors comprise an emulation system. An execution unit in each processor includes a table-lookup unit for emulating any type of logic gate function. A parallel bus connects an output of each processor to a multiplexor input with very other processor in a module. Each processor embeds a control store to store software logic-representing signals for controlling operations of each processor. Also a data store is embedded in each processor to receive data generated under control of the software signals in the control store. The parallel processors on each module have a module input and a module output from each processor. The plurality of modules have their module outputs inter-connected to module inputs of all other modules. A sequencer synchronously cycles the processors through mini-cycles on all modules. Logic software drives all of the processors in the emulation system to emulate a complex array of Boolean logic, which may be all of the logic gates in a complex logic semiconductor chip. Special control means associated with the embedded control store and the embedded data store in each of the processors enables them to emulate all or part of a memory array within a target logic entity being emulated by the multiprocessor emulation system. Each cycle of processing may control the emulation of a level of logic being verified by the emulation processor.

The present invention differs from this prior related art in that the cited related art deals with simulating the behavior of a chip design by emulating sequences emitted by some series of logic gates. The prior art method is not concerned with generating a specified workload on an entire system, as does the present invention, but rather, the prior art seems concerned with verifying whether a chip design will generate the expected output given a known set of inputs.

Yet another related art method to which the method of the present invention generally relates is described in U.S. Pat. No. 6,173,306 entitled "Dynamic Load Balancing". This prior art method is a method of controlling distribution of processing in a system that includes a plurality of host data processors connected to a data storage system, which includes a digital storage that is partitioned into a plurality of volumes. The method includes assigning ownership of the volumes to the host processors such that each of the host processors owns a different subset of the plurality of volumes, wherein a host processor is prohibited from sending I/O requests to any of the volumes, which it does not own. The method further includes monitoring the I/O requests that are sent to each of the volumes by each of the host processors; from information obtained through monitoring, generating workload statistics indicative of the distribution of workload among the host processors; detecting a workload imbalance in the workload statistics; and in response to detecting a workload imbalance, reassigning ownership of the volumes to the host processors so as to change the distribution of workload among the host processors.

The present invention differs from this prior related art in that the cited related art is concerned with sharing data storage across a multiprocessor system by limiting certain processors to certain storage volumes. The prior art method does, however, mention and reference dynamic reallocation of resources, as does the method of the present invention, with a considerable difference. The related art method discusses a resource as data storage, as opposed to the method of the present invention, which is concerned with CPU cycles as its resource. The method of the prior related art is only concerned with tracking the ambient I/O activity on them to determine if there is a data access bottleneck, and is not concerned with a workload processor, as the present invention is.

Yet another related art method to which the method of the present invention generally relates is described in U.S. Pat. No. 5,058,583 entitled "Multiple Monopolar System And Method Of Measuring Stroke Volume Of The Heart". This prior art method is a multiple monopolar system and method for measuring stroke volume of a patient's heart. An intracardiac impedance catheter is provided with a plurality of monopolar electrodes axially spaced along the surface of its distal end, and is used in conjunction with a distant reference electrode which may, for example, be incorporated into the conductive case of a pacemaker. The proximal end of the catheter is attached to the pacemaker, which, in addition to pulse generator circuitry and circuitry for sensing electrical activity of the heart and for controlling pacing rate, includes a constant-current source for current injection into the volume of blood in the patient's ventricle and an impedance processor for measuring the resultant voltage between one of the monopolar electrodes in the ventricle and the pacemaker case and for calculating stroke volume therefrom. A system and method are also disclosed for generating a three-phase relationship between cardiac output and heart rate for an individual patient at a particular workload, for purposes of determining optimal heart rate, as is a method of using the monopolar electrode configuration to detect ventricular fibrillation.

The present invention differs from this prior related art in that the cited related art deals with measuring the effect of a particular workload on a heart, which is not applicable or relevant to simulating a processor workload on a computer, as the method of the present invention does.

BRIEF SUMMARY OF THE INVENTION

It is therefore a method of the present invention to introduce a controlled workload onto a system that is spread evenly across the available CPU resources and which must be arranged to consume a precise, controllable portion of the resources.

Still another object of the present invention is to distribute a controlled load evenly across a large number of processors.

Still another object of the present invention is to determine how many processors are on a system.

Still another object of the present invention is to determine how much processor resource should be consumed (based on an input parameter) by each processor.

Still another object of the present invention is to determine which processors should be used for processing operations (based on an input parameter), thus defaulting to all other processors on the system.

Still another object of the present invention is to ensure the load percentage given is a value between 1 and 100 multiplied by the number of processors.

Still another object of the present invention is to establish a baseline for how much work can be done by one processor per a selected time unit.

Presented herein is a system wherein a Unisys Cellular Multiprocessor (CMP—ES7000 Server) provides usability for a number of platforms such as UNIX, Windows, Master Control Program (MCP of Unisys), or others.

The ES7000 Server 204 serves a multitude of CPU's as seen in FIG. 2. Here, a user console 200 utilizes the MultiSoak application 201 via a Windows operating system, 202.

The MultiSoak application can be used to distribute a controlled amount of workload to a selected group of processors or to distribute the workload over all the available processors. Methods are provided for allocating the workload on each processor or a subset group of processors in the system. Calculations are provided to determine the workload per time period and a segment of threads for each subset of CPU's selected.

The arrangement permits a selected amount of workload to be completed, which is retained by an internal "Work Completion Counter". It should be noted that this "Work Completion Counter" is not visible to the user, and is internal.

Thus, it is possible to distribute a "controlled load" evenly across a large number of processors or else specify an arbitrary subset of selected processors to manage the workload.

Still other objects, features and advantages of the present invention will become readily apparent to those skilled in the art from the following detailed description, wherein is shown and described only the preferred embodiment of the invention, simply by way of illustration of the best mode contemplated of carrying out the invention. As will be realized, the invention is capable of other and different embodiments, and its several details are capable of modifications in various obvious respects, all without departing from the invention. Accordingly, the drawings and description are to be regarded as illustrative in nature, and not as restrictive and what is intended to be protected by Letters Patent is set forth in the appended claims. The present invention will become apparent when taken in conjunction with the following description and attached drawings, wherein like characters indicate like parts, and which drawings form a part of this application.

BRIEF DESCRIPTION OF THE DRAWINGS

FIG. 2 is a diagram, which details the high-level description of the environment in which the MULTISOAK SMART SOAKER application works.

GLOSSARY ITEMS

Figure 1A:
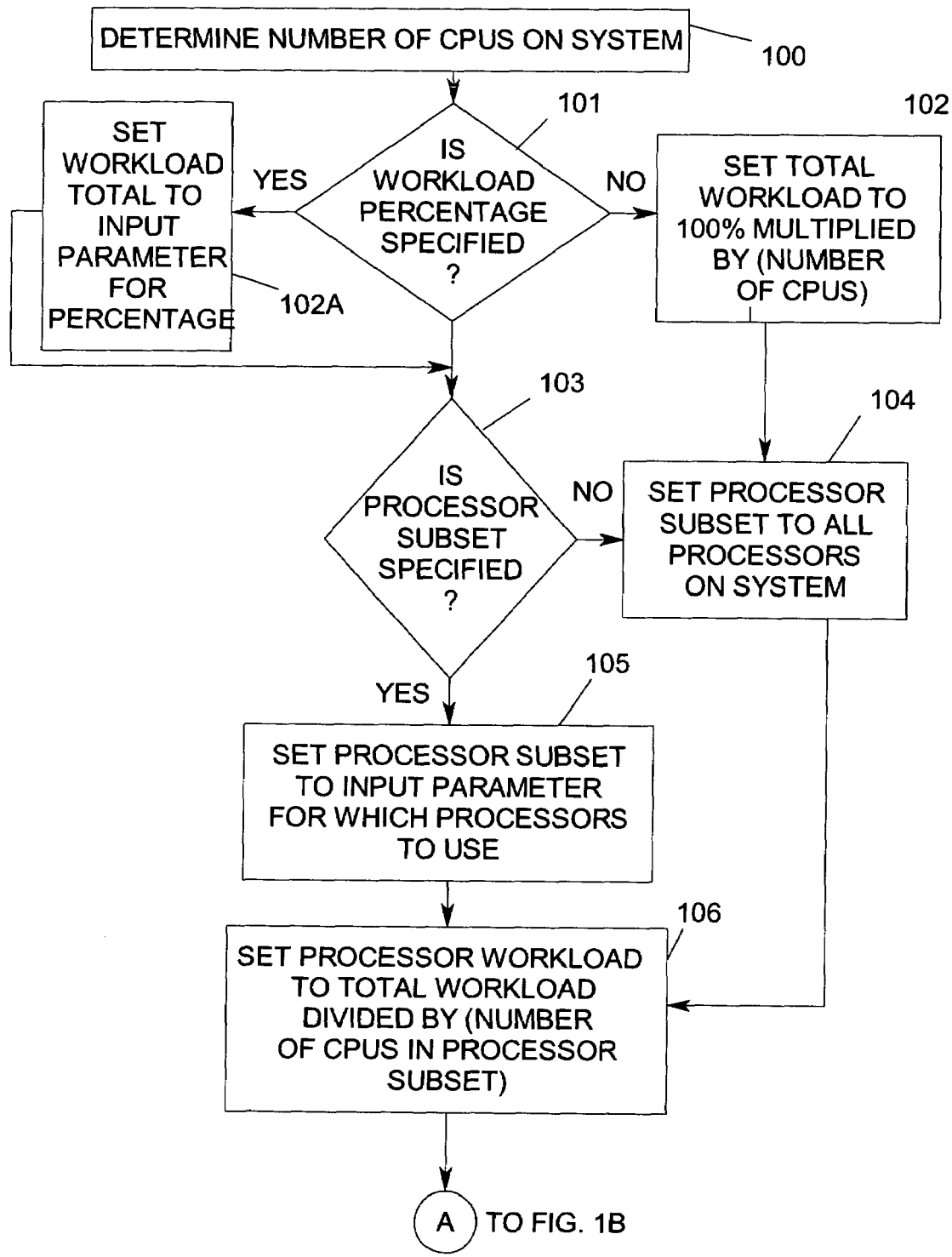
FIGS. 1A, 1B, and 1C are flowcharts illustrating the details of the process that utilizes the MULTISOAK application.

1. MultiSoak: A program that runs under the Windows operating system to create a system workload to be spread across one or more CPUs.

2. Process affinity: The assignment of a particular Windows process to a set of one or more CPUs. An affinitized process will execute using only the processors assigned to its affinity group.

3. Affinity group (aka Process group): A named set of system processors grouped together for the purposes of workload management. Once an affinity group has been established, the Server Sentinel Process Manager tool can assign Windows processes to the affinity group, thereby controlling the system resources available to those processes.

4. Server Sentinel: A suite of software tools sold with Unisys ES7000 servers to provide platform management capabilities.

5. Workload: The amount of work performed or capable of being performed by a set of one or more processes executing on a system within a specific time period.

6. Soaker application: An application designed to create a heavy workload on a system to allow testing of the system's performance during times of high resource usage.

7. Processor load: The portion of the total system workload that is executed by a single CPU. For a single-processor system, the system workload and the processor load on the single processor would be identical.

8. Load percentage: The total system workload to create, expressed as a percentage of the total available processor resources on the system. For instance, a load percentage of 100% can be fulfilled by making a single-processor system completely busy (processor load also equals 100%), or by making each processor in a dual-processor system half busy (processor load equals 50% for both processors).

9. CPU local unit of work: A sequence of computer instructions that affects only a single CPU and does not interfere with or depend on any other processors (for example, a series of CPU register-based operations).

10. Processor thread: A sequence of instructions from a single Windows application that are executed on the same CPU.

11. Time quantum: A random amount of time selected using any random number generation algorithm. For the purposes of this application, the time quantum is typically between 0.1 seconds and 1 second.

12. CPU scheduling algorithm: The algorithm in the Windows operating system that assigns Windows process threads to a given CPU. Typically such algorithms attempt basic workload balancing by assigning new work to less-busy processors rather than busier ones.

13. Processor subset: The subset of available CPUs on the system that are participating in generating the system workload. If no processor subset is specified, all CPUs on the system are used.

14. Server Sentinel Process Manager tool: A software tool included in the Server Sentinel product that provides management of affinity groups and process affinity.

15. Processor resources: Total work that can be performed by the CPUs on a given system.

16. Input parameter: A value used by a program that is specified by the user when the program is initiated.

17. One CPU local work unit: See "CPU local unit of work", above.

18. Load parameter: See "Load percentage", above. If the load percentage is specified by the user when MultiSoak is run, that value is the "load parameter". If no parameter is given, the load percentage defaults to 100%.

19. Total system resources: See "Processor resources", above.

20. Native scheduling algorithm: See "CPU scheduling algorithm", above.

21. Time unit: A fixed unit of time, for example one second.

22. Work unit: A set of CPU local operations. See "CPU local unit of work", above.

23. Local Work Unit: See "Work unit" and "CPU local unit of work", above.

24. Work Quantum: Amount of work (number of work units) that can be completed in a given time quantum (amount of time).

25. Work quanta completed: the number of work quanta done so far by all the CPUs participating in generating the workload.

26. CPU/Elapsed time ratio: the ratio of the amount of CPU time used during a given elapsed time. For example, a CPU that is 50% busy would have a CPU/elapsed time ratio of 50/100, or 1/2.

27. "Work Quanta Completed" counter: a counter that records the number of work quanta done so far by all the CPUs participating in generating the workload (see "Work quanta completed", above). This is expressed as a number of work units, in sets that comprise a work quantum. For example, if one work quantum is 1000 work units, the "work quanta completed" counter would be some number of thousands of work units (1000 if one quanta has been completed, 2000 for 2 quanta, etc.)

28. W/sec: Work units per second

29. WQ: Work Quantum (see "Work Quantum", above)

30. TQ: Time Quantum, an amount of time between 0.1 and 1 second selected at random 31. TN: Thread N, processing thread running on CPU N.

32. Work: Work is meant to represent a sequence of computer instruction which are processed by a processor to completion.

DETAILED DESCRIPTION

The general purpose of the software methodology described herein is to demonstrate the process and processor affinity features of large multi-processor systems such as the Unisys ES7000. The Unisys ES7000 is a Cellular Multiprocessor, which can manage multiple different operating system platforms. Today, there are various existing soaker applications, such as Microsoft's CPU Stress Tool, which simulate workloads that consume all of one or more processor's time. None of these existing tools, however, were able to distribute a controlled load evenly across a large number of processors or specify an arbitrary subset of the processors (which ones should be made busy and which should be left idle). It was therefore necessary to create an application, which would solve this problem.

FIG. 2 is a diagram detailing the environment in which the MULTISOAK SMART SOAKER runs. The environment consists of a console 200, which communicates back and forth with the MULTISOAK application 201. The MULTISOAK application 201 also communicates data with the Microsoft Windows Operating System 202, which communicates data with a set of CPUs which are shown from 1 through 32 in CPU set 203. (The true upper limit of this set is 64 processors; only 32 are shown to simplify the illustration.) The CPUs in group 203 are part of a Unisys server 204.

The MultiSoak smart soaker application 201 generates a simulated processor load on a system of CPU's. The load is specified as the percentage to consume of some or all of the processor resources available on the entire system 203. The percentage is an input parameter to the MultiSoak application 201. The processors to be loaded can also be specified by a parameter; or by default where the load is spread across all processors on the system.

Some examples may be used to clarify the load specification.

1. If a system has 2 processors, the total processor resource available is 200% (100% of 2 processors).
   (a) Setting the load parameter to 100, would then organize the use of half the total available processor resource. If the load is not targeted to a specific processor, it will be evenly spread across both processors, so each processor would be at 50% utilization of processor resources. Standard soaker applications would typically use all of one processor and none of the other in this case. That behavior could also be achieved by "MultiSoak" operations by explicitly restricting the load to just one processor or the other processor.
   (b) Setting the load parameter to 50% and specifying no processor restrictions would use one-quarter of the total system resources, or 25% of each processor. The standard approach would simply use 50% of just one processor, as would restricting the MultiSoak load to one processor or the other.
2. If a system has 16 processors, the load parameter can range from 1 to 1600 (100% of 16 processors).
   (a) A load parameter value of 800 with no processor restrictions would have the same effect as in the first example; all 16 processors would be 50% utilized.
   (b) A load parameter value of 800 restricted to any 8 processors would result in those processors being 100% busy and the other 8 being 100% idle. Standard soaker applications do not allow the user to select which processors should be loaded; instead those applications use simplistic selection criteria, such as loading the lowest-numbered CPUs first, such as CPU's 1 through 8.
   (c) A load parameter value of 1200 with no processor restrictions would result in all 16 processors being 75% busy. However, a standard soaker application would use all of 12 processors to achieve this effect, leaving 4 processors completely idle.
   (d) A load parameter value of 1200 targeted to any 14 processors would leave those 14 CPUs approximately 86% busy and would leave the remaining two CPUs idle. Previously, there was no way to achieve this effect using a standard soaker program.

The maximum load parameter value is 6400, allowing this utility to be used on systems with up to 64 processors.

The processor affinity demonstrations generally use systems with as many processors as possible for best effect. The standard demo involves at least two process groups, one running applications deemed "critical" by the customer, the other running less important applications. The "critical" group usually has more processors assigned to it than the non-critical group. The demo involves introducing a load on the system that causes processor utilization by the critical group to exceed a predetermined maximum threshold (specified by the user when the processor group was created), resulting in decreased performance of the critical applications. The overload is then resolved by the presently described affinity tools by automatically reassigning processors from the non-critical group to the critical group to bring the load on the critical group back within an acceptable level. This requires that the load be distributed in such a way that the critical group becomes overloaded before the non-critical group is utilized, otherwise there are no underutilized CPUs to take from the non-critical group to demonstrate the desired behavior.

The technique that has been developed and used is as follows:

Technique Sequence

1. Determine how many processors are on the system.

2. Determine how much processor resource should be consumed (based on the specified load percentage).

3. Determine which processors should be used (based on the specified processor subset). If the user doesn't give a processor subset parameter, the program uses all CPUs on the system.

4. Ensure the load percentage given is a value between 1 and 100 multiplied by the number of processors from step 3. This is shown on a simple console window. The user can specify a load percentage as an input parameter when the console application is run.

5. Establish a baseline for how much work can be done by one processor per a selected time unit (for example, one second).
   5.1 Start a timer.
   5.2 Perform a "CPU local" unit of work (one which affects only a single CPU and does not interfere with or depend on other processors, such as a series of CPU register based operations).
   5.3 Stop the timer.
   5.4 Repeat steps 5.1 through 5.3 until a consistent minimum value is obtained. This establishes the time actually needed to perform the operations in step 5.2, adjusted to compensate for time slicing and other CPU interrupts. The work unit should be significantly larger than the time taken to perform the timer manipulation.

5.5. Divide the value in 5.4 by the time unit to determine how many CPU local work units can be completed per time unit.

6. Establish how many CPU local units of work must be completed per time unit in order to consume the proportion of system resources determined in step 2.

7. Start one processor thread for each processor to be used. Each thread independently does the following:
   7.1 Divide the number of units of work from step 6 by the number of processors from step 3. This is the number of work units each processor should execute.
   7.2 Select a random time quantum (typically in the 0.1-1 second range) using any random number generation algorithm.
   7.3 Multiply the work units from step 7.1 by the time quantum to establish an amount of work per time quantum that should be done by this process thread to approximate the required resource consumption. Call this a "work quantum".
   7.4 Each participating CPU executes enough CPU local work units to make one work quantum.
   7.5 Update a "work quanta completed" counter to record the completion of the work quantum. This counter is shared by all the process threads being used to generate the simulated load.
   7.6 Check the work quanta completed against the work that should have been completed in the elapsed time so far.
   7.7 If the completed work is less than it should be, perform another work quantum by repeating steps 7.4-7.6.
   7.8 Wait for a time quantum to let elapsed time increase to bring the CPU/Elapsed time ratio back to the desired level.
   7.9 Go to step 7.6.

The process described above assumes that the CPU scheduling algorithm acts to distribute CPU time fairly between threads, effectively running each thread on its own CPU. If this even distribution is not assured by native scheduling algorithms, it is possible to add an additional step at step 7 to bind each thread to a single processor. Also note that the loop described in step 7 (of the above Technique Sequence) does not terminate. Logic to handle graceful shutdown is not shown in order to keep the logic flow simpler, but could be added without significantly degrading performance.

Figure 1B:
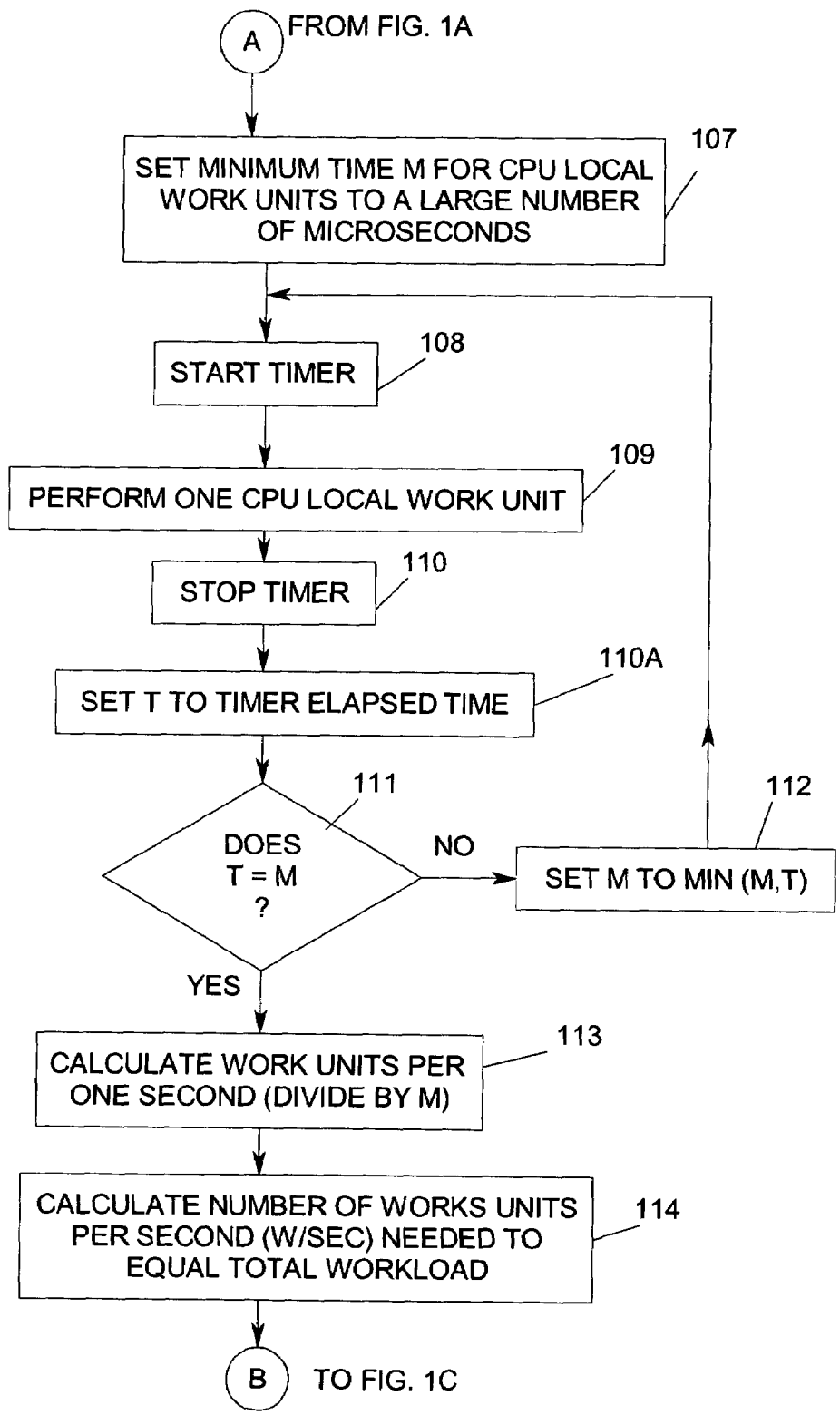
Figure 1C:
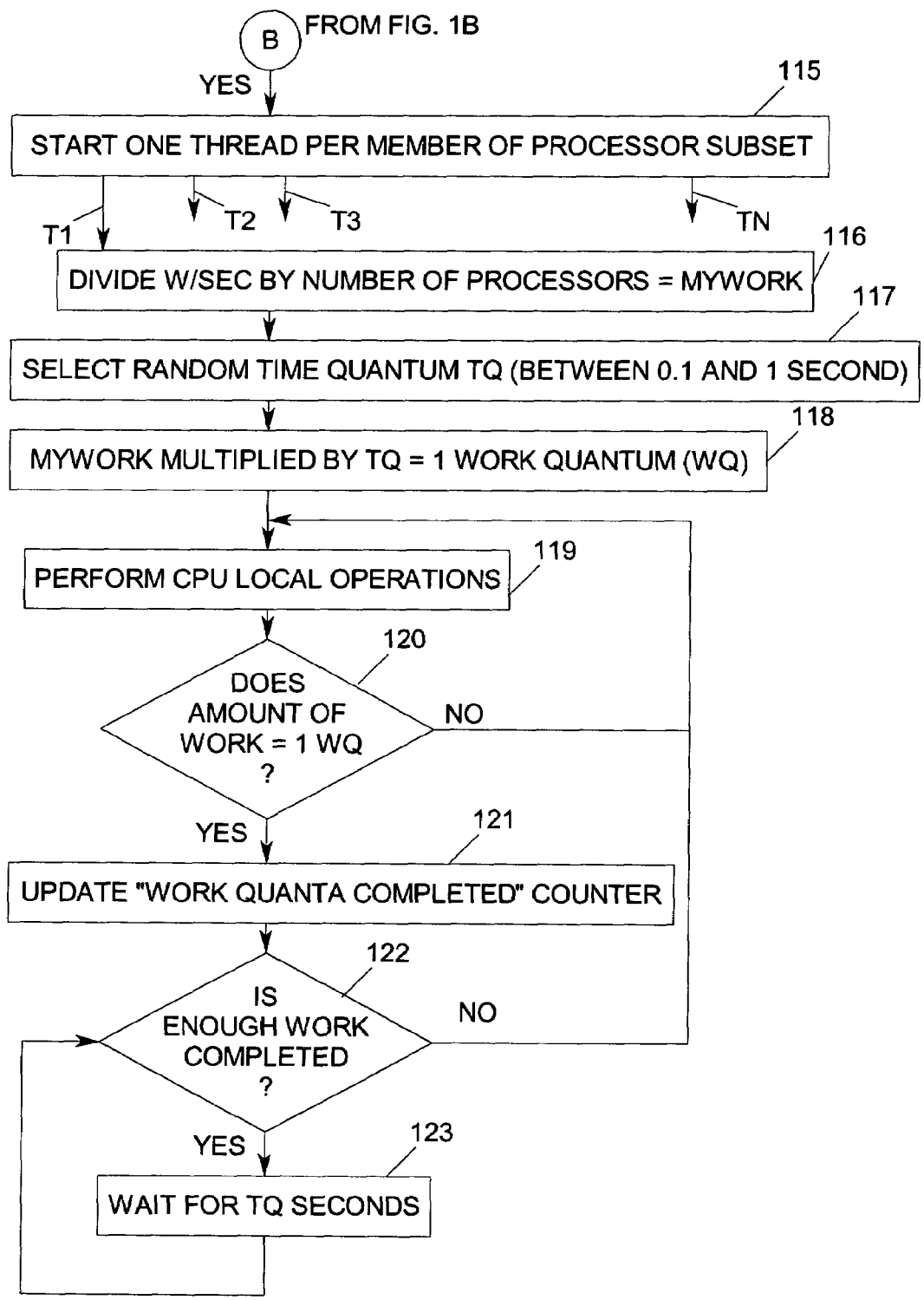

FIGS. 1A, 1B, and 1C are flowcharts that illustrate the general process of the MULTISOAK application.

Referring now to the drawings and FIG. 1A in particular, a flowchart is shown of the MULTISOAK application process. This phase begins with a process to determine the number of CPUs on the system (block 100). An inquiry is followed, which checks to see whether or not the workload percentage is specified (Diamond 101).

If the answer to inquiry 101 is No, the total workload is set to 100% multiplied by the number of CPUs on the system (block 102), which means that each CPU is 100% utilized. If the answer to inquiry 101 is Yes, the total workload is set to the specified percentage (Block 102A), and then another inquiry is made as to whether or not the processor subset is specified (Diamond 103). If the answer to inquiry 103 is No, the processor subset is set to all processors on the system (block 104). If the answer to inquiry 103 is Yes, the processor subset is set to the input parameter for which processors to use (block 105). Next, the processor workload is set to the total workload percentage divided by (number of CPUs in the processor subset) (block 106). Now referring to FIG. 1B, which is a continuation from connector A from FIG. 1A. The minimum time M for CPU local work units is then set to a large number of microseconds (e.g., 1,000,000) (block 107), followed by a process that initiates a timer at block 108. Next, one CPU local work unit is performed (block 109), and the timer is then stopped (block 110). One CPU that is participating in the workload performs one work unit. A work unit is a series of CPU-constrained arithmetic operations, for example, adding a thousand numbers. How long the timer ran (how long it took to do the work unit) is time T (Block 110A).

An inquiry is then made to check whether or not the time T is equal to the previous minimum time M (diamond 111). If the answer to inquiry 111 is No, and the times are not equal, then minimum time M is set to the smaller of time T or the previous value of M at (block 112), and the process loops back up to block 108 to restart the timer to obtain a new time T, and continues through the process again. If the answer to inquiry 111 is Yes, and the times are equal, then a process to calculate work units per second (divide one second by the minimum time) is initiated at block 113. Next, the number of work units per second (W/sec) needed to equal total workload is calculated (block 114), and the process continues to FIG. 1C through connector B.

Now referring to FIG. 1C, which is a continuation from connector B from FIG. 1B. One thread per member of the processor subset is then started (block 115), whereby any number of the threads (T1-TN) can then lead to the next process. Each CPU participating in the workload is running a single processor thread to generate its share of the load. CPU<n>, where <n> can range from 0 to (number of CPUs on the system –1), is running thread <n>. If CPU 1 is one of the participating CPUs, its thread can be called T1, and CPU 2 would run T2, and so forth. Next, W/sec is divided by the number of processors to arrive at the amount of work to be done by each processor (MYWORK) (block 116). Another process is then initiated to select a random time quantum TQ (between 0.1 and 1 second) (block 117). MYWORK is the amount of work to be done by each participating processor. MYWORK is then multiplied by TQ to determine the value of 1 work quantum (WQ) at block 118, and is followed by a block to perform CPU local operations (block 119). An inquiry is then made to check whether or not the amount of work is equal to 1 WQ (diamond 120). If the answer to inquiry 120 is No, the process loops back to perform additional CPU local operations at block 119 and continues through the process.

If the answer to inquiry 120 is Yes, the "Work Quanta Completed" counter is updated (block 121). Another inquiry is then made to check whether or not enough work is completed (diamond 122). If the answer to inquiry 122 is No, the process performs additional CPU local operations at block 119 and then continues through the process again. If the answer to inquiry 122 is Yes, the process waits for TQ seconds at block 123, and then loops back to inquiry 122 to check if enough work has been completed, and goes through a loop. (The termination of this loop is not shown in order to keep the logic flow simpler).

To illustrate this technique, assume that the MULTISOAX program is being run on a system with 16 processors with the goal of consuming 50% of 4 of the processors (CPUs 0, 1, 2, and 3). Referring now to FIGS. 1A, 1B, and 1C, the process to determine the number of CPUs on the system at block 100 would find 16 processors. The inquiry at Diamond 101 would find that a workload percentage of 200 is specified (50%×4 processors), out of the 1600% available on a 16 processor system. Since the answer to inquiry 101 is Yes, the total workload is set to the input parameter of 200 at block 102A, and then the inquiry at Diamond 103 is made as to whether or not the processor subset is specified. Since the answer to inquiry 103 is also Yes, the processor subset is set at Block 105 to the four CPUs (0, 1, 2, and 3) specified by the user. At Block 106, the processor workload for each participating CPU is set to the selected total workload percentage (200) divided by the number of CPUs in the processor subset (4), for a processor workload of 50%.

Next, the program must determine how many CPU operations are required to generate a workload of 50% on each of the four selected processors. The minimum time needed to perform one CPU local work unit is set to a large number of microseconds (for example, 1,000,000) at Block 107. Blocks 108 through 110 determine how long it takes to perform one CPU local work unit (such as adding a series of numbers together) on any one of the CPUs in the processor subset; repeat these steps until a consistent minimum value is obtained (diamond 111 and block 112). Suppose that the consistent minimum time to perform this series of additions on this CPU was 1 microsecond; block 113 then divides that time into one second to determine the number of CPU local work units that can be done by each processor per second. In this example, one second (1,000,000 microseconds) divided by one microsecond yields 1,000,000 local work units per second per CPU. Next, the number of work units per second (W/sec) needed to equal the total workload of 200% is calculated (block 114). This is equivalent to making 2 processors completely busy, and since we know from block 113 that it takes 1,000,000 work units per second to make one processor completely busy, the value of W/sec at block 114 will be 2,000,000 in this example.

One process thread is started on each of the four selected CPUs at block 115. Each step from this point forward is performed in parallel on each of the four processors.

Block 116 calculates how much work each of the four processors must do (MYWORK) by dividing W/sec by 4; 2,000,000 divided by 4 is 500,000 work units. At block 117, a random time quantum TQ (between 0.1 and 1 second) is chosen; for this example, assume that TQ is 0.1 seconds. MYWORK (500,000 work units) is then multiplied by TQ (0.1 seconds) at block 118 to determine the amount of work this process thread should do over time TQ to generat the required workload on this processor. This value (MYWORK*TQ) is called a work quantum (WQ). In this example, WQ has the value 50,000 (500,000*0.1).

At block 119 the program begins performing work units, one thread at a time. After each operation, an inquiry is made at diamond 120 to check whether or not the number of work units done is equal to 1 WQ (50,000). If the answer to this inquiry is No, the process loops back to block 119 to perform another CPU work unit. If the answer to inquiry 120 is Yes, the "Work Quanta Completed" counter shared by all the participating CPUs is updated at block 121 to indicate that another 50,000 work units (1 WQ) of the 2,000,000 required in total have been finished. Another inquiry is then made at diamond 122 to check whether or not the new "work quanta completed" value indicates that all the work needed for the elapsed time so far has been done; the desired value is 50,000 work units from each of the four processors per 0.1 second time quantum, or 200,000 work units per 0.1 seconds. If the answer to inquiry 122 is No, the process loops back to block 119 to perform additional CPU work units. If the answer to inquiry 122 is Yes, the process waits for TQ (0.1) seconds at block 123, and then loops back to inquiry 122 to check if enough work has been completed by all the CPUs in the new elapsed time.

Described herein has been a method and system whereby a controlled workload can be introduced into a network of affiliated processors. Applications being processed will consume processor resources and can be called "soakers" as they soak up or consume processor operations.

The present system permits selection of an arbitrary set of processors to be utilized for processing the workload of applications and additionally allows for each utilized processor to manage an allocated percentage of the total workload. The load percentage given to each utilized CPU is a value between 1 and 100. The system workload is that load percentage multiplied by the total number of utilized processors working in the network.

When each utilized processor has completed its assigned workload, then a "Work-Completed Counter" indicates that the total amount of work assigned has now been completed.

Though one embodiment of the invention has been illustrated, other embodiments may be implemented which still utilize the essence of the invention as defined in the attached claims.

What is claimed is:

1. In a network of affiliated processors (CPUs), a computer system for selecting a subset group of said processors (CPUs) to be utilized for processing a total workload comprising:
   (a) means for selecting a subset group of said processors (CPUs) to be utilized for processing, where said subset group is less than or equal to the total number "TN" of the processors (CPU) in said network;
   (b) means for distributing the total workload among the selected subset group of processors (CPUs);
   (c) means for allocating a percentage of the total workload which is to be allocated to each of the processors (CPUs) in the selected subset group of processors (CPUs), said means (c) for allocating said total workload including:
      (c1) means for determining how many processor (CPU) operations are required to generate a workload of "P" percent on each processor (CPU) in the selected subset group of processors (CPUs);
      (c2) means for starting a process thread on each processor in said selected subset group of processors (CPUs); and
      (c3) means for calculating amount of work (MYWORK) that each processor (CPU) in said selected subset group of processors (CPUs) must do to enable completion of the total workload for the selected subset group of processors (CPUs), said means (c3) for calculating amount of work (MYWORK) including:
         (c3a) means for determining a minimum time "M" for one processor (CPU) in the selected subset group of processors (CPUs) to accomplish one work unit (WU);
         (c3b) means for determining the number of work units (WU) that each processor in said selected subset group can execute in one second;
         (c3c) means for calculating the number of work units (WU) per second needed to execute the total workload (TW);
         (c3d) means, operating in parallel, for starting one process thread on each of the processors (CPUs) in the selected subset group;
         (c3e) means for determining amount of work each thread should do during a selected 0.1 to 1 sec time period designated as the Time Quantum (TQ) to enable completion of the total workload for the selected subset group of processors (CPUs);

(c3f) means for deriving a Work Quantum (WQ) for each processor (CPU) of the selected subset group where:

$WQ = MYWORK \times TQ$; and (c3g) means for indicating when the Work Quantum (WQ) completed has matched the total workload;

(d) means for counting the processing work completed by each processor in the selected subset group of processors (CPUs); and (e) means for determining when said total workload is fully completed.

2. In a system of multiple processors (CPUs), a method for allocating the workload of application processing to a selected group of processors (CPUs) comprising the steps of:

(a) determining the total number of processors in said system;

(b) specifying a percentage of the total system processor resources to be consumed and designating this as an input parameter;

(c) specifying a subset group of processors that will be utilized to handle applications;

(d) setting each of the processors in said selected subset group to operate at an equal share of the selected input parameter, that is, the total workload divided by the number of processors selected for the utilized subset of processors (CPUs);

(e) setting the minimum time "M" for work units of each processor (CPU) to a large number "L" of microseconds where "M" designates the minimum time for one processor to perform one local work unit;

(f) establishing the time "T" that it takes to perform one processor (CPU) local work unit on any of the processors (CPUs) in the selected subset group of processors (CPUs);

(g) repeating steps (e) and (f) until a consistent average minimum value "M" is obtained;

(h) determining the number of each processor's (CPU's) local work units that can be accomplished by each subset group processor (CPU) per second;

(i) calculating the number of work units per second (w/sec) of the processors in the selected subset group of processors (CPUs) needed to equal the total workload placed on the system;

(j) allocating one thread of a running application to each processor (CPU) in the selected subset group of processors (CPUs);

(k) calculating how much work each of the processors in the selected subset group of processors (CPUs) must do by dividing the number of work units/sec (w/sec) by the number of processors (CPUs) in the selected subset group where this value is designated MYWORK;

(l) choosing a time quantum (TQ) between 0.1 and 1.0 seconds;

(m) determining the amount of work each process thread should do in the time period "TQ" by multiplying the value of MYWORK by the chosen time quantum (TQ) thus to allocate the required workload for each of the processors in the selected subset group of processors (CPUs) where the value of MYWORK*TQ is designated as the work quantum (WQ);

(n) performing, by each processor (CPU) in the selected subset group of processors (CPUs), of the work units (MYWORK) established for each processor (CPU) in the selected subset group of processors (CPUs);

(o) checking to see that each processor (CPU) in the selected subset group of processors (CPUs) has accomplished its designated work quantum (WQ);

(p) utilizing a "Work-Quantum Completed" Counter, shared by all the processors (CPUS) in the selected subset group of processors (CPUs), to update each set of (1 WQ) of work units completed by a processor (CPU) in the selected subset group of processors (CPUs); and (q) checking said "WQ" Completed Counter to indicate that the work Quantum (WQ) completed value indicates that all the ongoing applications involved have been fully processed.

* * * * *